United States Patent Office 3,783,143
Patented Jan. 1, 1974

3,783,143
N-CYCLOPROPYLMETHYL-PHENYLUREAS
Lester L. Maravetz, Westfield, N.J., assignor to Esso
Research and Engineering Company
No Drawing. Original application July 27, 1970, Ser. No.
58,672, now Patent No. 3,728,836. Divided and this
application Feb. 12, 1973, Ser. No. 331,723
Int. Cl. C07c 127/20
U.S. Cl. 260—553 A                3 Claims ABSTRACT OF THE DISCLOSURE
Compounds characterized by the following structural formula:

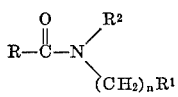

wherein R is one selected from the group consisting of Y—CH$_2$ and

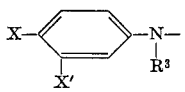

Y is one selected from the group consisting of chlorine, bromine and fluorine, X is one selected from the group consisting of hydrogen, chlorine, CF$_3$, C$_1$ to C$_4$ alkyl, bromine, C$_1$ to C$_4$ alkoxy, and C$_1$ to C$_4$ alkylthio, and X' is one selected from the group consisting of chlorine, hydrogen, CF$_3$, and bromine; R$^1$ is C$_3$ to C$_4$ cycloalkyl optionally substituted with C$_1$–C$_3$ alkyl, chlorine, bromine, R$^2$ is one selected from the group consisting of hydrogen, and C$_1$ to C$_4$ alkyl, cyclopropyl, cyclopropylmethyl and C$_1$ to C$_3$ alkoxy, and R$^3$ is one selected from the group consisting of hydrogen, C$_1$–C$_3$ alkyl, cyclopropyl, cyclobutyl, cyclopropylmethyl or cyclobutylmethyl, optionally substituted with C$_1$ to C$_3$ alkyl, chlorine, and bromine; $n$ is either 0 or 1.

These compounds have been found to possess biological activity and have been found to be useful as herbicides.

This is a division of application Ser. No. 58,672, filed on July 27, 1970, now U.S. Pat. 3,728,386.

This invention relates to N-cycloalkylalkyl and N-cycloalkyl substituted phenyl ureas. In another aspect this invention relates to N-cycloalkyl and N-cycloalkylalkyl halo acetamides. In yet another aspect, this invention relates to employing either the N-cycloalkylalkyl or N-cycloalkyl substituted phenyl ureas or the halo acetamides as herbicides.

Compounds possessing the following structures

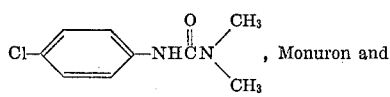, Monuron and

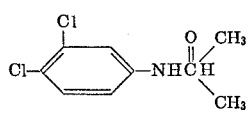

Diuron are commercially important herbicides described in U.S. Pat. 2,655,445. This patent as well as several others designate groups attached to the N which is not bonded with a phenyl ring as being H, alkyl, alkenyl, alkynyl but not cycloalkyl or cycloalkylalkyl. Belgium Pat. 631,289 and U.S. Pat. 3,309,192 describe herbicidal compounds where one of these groups is cyclopentyl, cyclohexyl, cyclopentylmethyl, and cyclohexylmethyl.

In addition, compounds of the following general formula are known to be herbicidal agents, where X=F, Cl, Br, I,

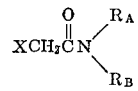

and R$_A$ and R$_B$ are H, alkyl, alkenyl, alkynyl or halogen substituted derivatives thereof. These types are described in U.S. Pat. 2,864,683.

However, none of the above mentioned prior art makes mention of cyclopropyl or cyclobutyl substituted derivatives.

It is generally known that larger ring systems are relatively easily constructed from inexpensive starting materials, but by contrast the lower cycloalkyl ring systems are not nearly as readily available and must be prepared through novel means. For this reason the compounds of this invention represent new and unique compounds which have not been synthesized heretofore.

The compounds of the subject invention are characterized by the following generic formula:

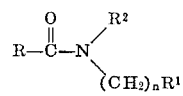

wherein R is one selected from the group consisting of Y—CH$_2$ and

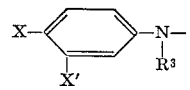

Y is one selected from the group consisting of chlorine, bromine and fluorine, X is one selected from the group consisting of hydrogen, chlorine, CF$_3$, C$_1$ to C$_4$ alkyl, bromine, C$_1$ to C$_4$ alkoxy, and C$_1$ to C$_4$ alkylthio, and X' is one selected from the group consisting of chlorine, hydrogen, CF$_3$, and bromine; R$^1$ is a C$_3$ to C$_4$ cycloalkyl optionally substituted with C$_1$–C$_3$ alkyl, chlorine, bromine, R$^2$ is one selected from the group consisting of hydrogen, and C$_1$ to C$_4$ alkyl, cyclopropyl, cyclopropylmethyl and C$_1$ to C$_3$ alkoxy, and R$^3$ is one selected from the group consisting of hydrogen, C$_1$–C$_3$ alkyl, cyclopropyl, cyclobutyl, cyclopropylmethyl or cyclobutylmethyl, optionally substituted with C$_1$ to C$_3$ alkyl, chlorine, and bromine; $n$ is either 0 or 1.

Examples of novel compounds which are encompassed by the above generic formula are following:

Compound:
number:
1 _____ 3-phenyl-1-cyclopropylmethylurea.
2 _____ 3-phenyl-1-cyclopropylmethyl-1-methylurea.
3 _____ 3-phenyl-3-cyclopropylmethyl-1,1-dimethylurea.
4 _____ 3-(3,4-dichlorophenyl)-3-cyclopropylmethyl-1,1-dimethylurea.
5 _____ 3-phenyl-3-cyclopropyl-1,1-dimethylurea.
6 _____ 3-(4-chlorophenyl)-1-cyclopropyl-1-methylurea.
7 _____ 3-(4-chlorophenyl)-1-cyclopropylmethyl-1-methylurea.
8 _____ 3-(3,4-dichlorophenyl)-1-cyclopropylmethyl-1-methylurea.
9 _____ 3-(3-trifluoromethylphenyl)-1-cyclopropylmethyl-1-1-methylurea.
10 _____ 3-(3,4-dichlorophenyl)-1-cyclopropylmethyl-1-n-propylurea.
11 _____ 3-(4-bromophenyl)-1-(1-methylcyclopropylmethyl)-1-methoxyurea.
12 _____ 3-(4-bromophenyl)-1-(1-methylcyclopropylmethyl)-1-methylurea.
13 _____ 3-phenyl-3-(2-n-propylcyclopropylmethyl)-1-methylurea.
14 _____ 3-(3-chloro-4-methylphenyl)-1-(2,2-dichlorocyclopropylmethyl)-1-methylurea.
15 _____ 3-(4-methoxy-n-propylphenyl)-1-cyclobutylmethyl-1-methylurea.
16 _____ 3-(3-chloro-4-methylthiophenyl)-1-cyclobutylmethyl-1-methoxyurea.
17 _____ 3-(3-n-butylthio-4-trifluoromethylphenyl)-1-cyclobutyl-1-methoxymethylurea.
18 _____ 3-(4-chlorophenyl)-1-cyclobutylmethyl-1-n-butylurea.

TABLE—Continued

Compound number:

19........ 3-(3-bromo-4-methoxyphenyl)-1-cyclobutylmethyl-1-methylurea.
20........ 3-(4-n-butylphenyl)-3-(2-bromocyclobutylmethyl)-1-methylurea.
21........ 3-phenyl-1-cyclopropyl-1-cyclopropylmethylurea.
22........ 3-phenyl-1,1-bis(cyclopropylmethyl) urea.
23........ N-cyclopropyl-N-methyl-α-chloroacetamide.
24........ N-cyclopropylmethyl-N-ethyl-α-chloroacetamide.
25........ N-cyclopropylmethyl-N-n-propyl-α-chloroacetamide.
26........ N-cyclopropylmethyl-N-n-butyl-α-chloroacetamide.
27........ N-cyclopropylmethyl-N-iso-propyl-α-chloroacetamide.
28........ N-cyclopropylmethyl-N-n-propyl-α-bromoacetamide.
29........ N-cyclopropylmethyl-N-ethyl-α-fluoroacetamide.
30........ N-(1-methylcyclopropylmethyl)-N-ethyl-α-chloroacetamide.
31........ N,N-bis(cyclopropylmethyl)-α-chloroacetamide.
32........ N-cyclopropyl-N-cyclopropylmethyl-α-bromoacetamide.
33........ N-(2,2-dichlorocyclopropylmethyl)-N-n-propyl-α-chloroacetamide.
34........ N-cyclobutylmethyl-N-ethyl-α-chloroacetamide.
35........ N-cyclobutyl-N-n-propyl-α-chloroacetamide.
36........ N-cyclopropylmethyl-N-2-methoxyethyl-α-chloroacetamide.
37........ N-cyclopropylmethyl-N-allyl-α-chloroacetamide.

The foregoing compounds can be readily prepared by the following synthetic method.

The ureas of this invention may be prepared by such conventional methods as illustrated by the following equations where the various groups are the same as indicated previously.

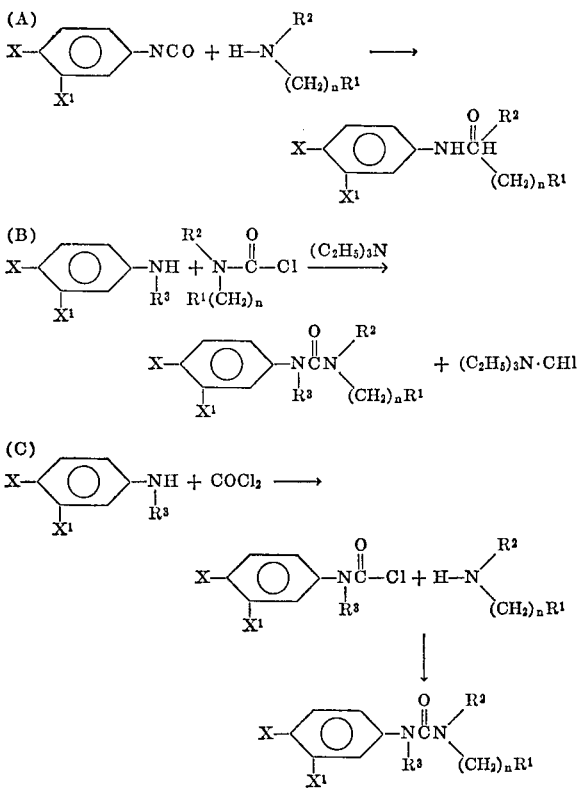

Method A involves the reaction of an arylisocyanate with an amine usually in chemically equivalent amounts to give the corresponding substituted urea. In Method B, an aniline reacts with a carbamoyl chloride to yield the urea. A tertiary amine such as triethylamine, dimethylaniline, or pyridine may be used as an acid acceptor. Method C involves the reaction of an aniline with phosgene to form the intermediate carbamoyl chloride. This reactive compound is then reacted with an amine to form the urea.

In all these reactions inert solvents such as benzene, toluene, xylene, diethyl ether, chlorinated hydrocarbons, dioxane, dimethylformamide, acetonitrile and the like may be used to advantage if desired. Usually temperatures of 0 to 150° C. are sufficient for the above reactions.

The haloacetamides of this invention may also be prepared via known methods.

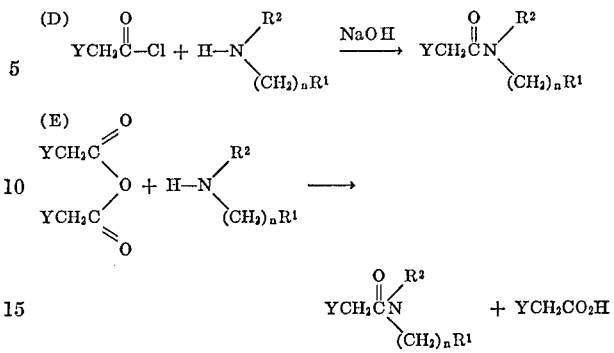

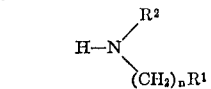

In method D an α-haloacetylchloride is reacted with an amine in the presence of a base such as NaOH, KOH, NaHCO₃ etc., to form the corresponding substituted α-haloacetamide. Usually lower temperatures e.g., —10° to 30° C. are employed to avoid the reaction of the amine with the α-halo atom. In method E, a haloacetic anhydride reacts with the amine either neat or in solvent to form the product. Suitable solvents for these reactions are the same as listed for the ureas.

The novel cyclic amines $$H-N\begin{matrix}R^2\\(CH_2)_nR^1\end{matrix}$$

may themselves be prepared according to the methods described in copending application bearing U.S. Ser. No. 749,326.

The compounds of the invention have general herbicidal properties. They are especially useful in certain types of weed control such as, for example, in application to crop lands to give control of the common weeds, without harming the crop plants; and for the control of crabgrass in lawns.

Herbicidal compositions of the invention are prepared by admixing one or more of the active ingredients defined heretofore, in herbicidally effective amounts with a conditioning agent of the kind used and referred to in the art as a pest control adjuvant or modifier to provide formulations adapted for ready and efficient application to soil or weeds (i.e., unwanted plants) using convention applicator equipment.

Thus, the herbicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cyclic ketones, relatively high up to about 50% by weight or more concentration of the active ingredient can be obtained in solution.

The herbicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal compositions are applied either as a spray, granular or a dust to the locus area to be protected from undesirable plant growth, commonly called weeds, i.e. plants growing where they are not wanted. Such application can be made directly upon the locus or area and the weeds thereon during the period of weed infestation in order to destroy the weeds, or alternatively, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray, dust or granular, will contain from about 0.1% to 100% by weight of the active compound.

Fertilizer materials, other herbicidal agents, and other pest control agents such as insecticides and fungicides can be included in the herbicidal compositions of the invention, if desired.

The term "carrier" or "diluent" as used herein means a material, which can be inorganic or organic and synthetic or of natural origin, with which the active ingredient is mixed or formulated to facilitate its storage, transport, and handling the application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calicum silicates can also be used, and many proprietary products of this type are available commercially. The carrier can also be an elemental substances such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present invention.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvent should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc., by which the compounds and/or compositions described and claimed are prepared and/or used.

EXAMPLE 1

Preparation of 3-phenyl-1-cyclopropylmethyl-1-methylurea

A flask was charged with N-cyclopropylmethyl-N-methylamine (5.1 g., 0.06 mole), anhydrous ether (125 ml.) and triethylamine (6 drops). To this stirred solution at room temperature was added a solution of phenylisocyanate (6.55 g., 0.055 mole) in an equal volume of ether over a ½ hour period. White solids precipitated and the slurry was heated at reflux for 1 hour, chilled, and filtered. The product urea melted sharply at 103° C.

*Analysis.*—Calcd. (percent): C, 70.56; H, 7.9; N, 13.72. Found (percent): C, 70.41; H, 7.8; N, 14.10.

EXAMPLE 2

Preparation of 3-(4-chlorophenyl)-1-cyclopropyl-methyl-1-methylurea

In the same manner as described above, N-cyclopropylmethyl-N-methylamine (3.0 g., 0.035 mole) was reacted with p-chlorophenylisocyanate (6.15 g., 0.04 mole) to give the product urea, M.P. 115–16° C.

*Analysis.*—Calcd. (percent): C, 60.5; H, ..35; N, 11.8. Found (percent): C, 60.15; H, 6.26; N, 12.14.

EXAMPLE 3

Preparation of 3-(3,4-dichlorophenyl)-1-cyclopropyl-methyl-1-methylurea

N - cyclopropylmethyl - N - methylamine (5.1 g., 0.06 mole) when reacted with 3,4-dichlorophenylisocyanate (10.34 g., 0.055 mole) in benzene gave a white solid, M.P. 102–4° C.

*Analysis.*—Calcd. (percent): C, 52.8; H, 5.17; N, 10.25. Found (percent): C, 53.29; H, 5.33; N, 10.42.

EXAMPLE 4

Preparation of 3-(3-trifluoromethylphenyl)-1-cyclopropyl-methyl-1-methylurea

N - cyclopropylmethyl - N - methylamine (5.1 g., 0.06 mole) was reacted with m-trifluoromethylphenylisocyanate (10 g. 0.053 mole) in diethylether to yield pearl-white platelets of the product urea, M.P. 112–13° C.

*Analysis.*—Calcd. (percent): C, 57.2; H, 5.54; N, 10.25. Found (percent): C, 57.5; H, 5.61; N, 10.16.

EXAMPLE 5

Preparation of 3-(3,4-dichlorophenyl)-1-cyclopropyl-methyl-1-n-propylurea

The reaction between N-cyclopropylmethyl-N-n-propylamine (5.0 g., 0.044 mole) and 3,4-dichlorophenylisocyanate (8.3 g., 0.044 mole) carried out in benzene gave the desired product, M.P. 73–77° C.

*Analysis.*—Calcd. (percent): C, 55.47; H, 6.12; N, 9.67. Found (percent): C, 55.8; H, 6.03; N, 9.32.

EXAMPLE 6

Preparation of 3-phenyl-3-cyclopropylmethyl-1,1-dimethylurea

A flask was charged with N-(cyclopropylmethyl)aniline (14.7 g., 0.1 mole), triethylamine (15.2 g., 0.15 mole) and benzene (100 ml.). To this stirred solution was added dimethylcarbamoylchloride (10.7 g., 0.1 mole) in 50 ml. of benzene dropwise and the resulting mixture was refluxed for about 6 hours. The triethylamine hydrochloride salt was removed by filtration and the filtrate was washed consecutively with 9% aqueous HCl, and water and then dried over anhydrous $MgSO_4$. The solvent was removed under reduced pressure resulting in a residual oil as the product.

*Analysis.*—Calcd. (percent): N, 12.83. Found (percent): N, 12.62.

EXAMPLE 7

Preparation 3-(3,4-dichlorophenyl)-3-cyclopropylmethyl-1,1-dimethylurea

In basically the same manner as described in the previous example, an excess of dimethylcarbamoylchloride (7 g., 0.065 mole) was reacted with N-(cyclopropylmethyl)-3,4-dichloroaniline (8.4 g., 0.04 mole) in the presence of triethylamine (8.0 g., 0.079 mole) and benzene. The product urea was an oil.

*Analysis.*—Calcd. (percent): N, 9.76. Found (percent): N, 9.33.

EXAMPLE 8

Preparation of N,N-bis(cyclopropylmethyl)-α-chloroacetamide

A flask was charged with N,N-bis(cyclopropylmethyl)amine (5.0 g., 0.04 mole), 20% aqueous sodium hydroxide solution (9.7 g.) and 1,2-dichloroethane (50 ml.). This mixture was cooled to $-10°$ C. with stirring and chloroacetylchloride (4.97 g., 0.044 mole) was added dropwise over 15 minutes. An exothermic reaction occurred and the temperature was maintained at 0° to 10° C. Stirring was continued until room temperature was attained. The organic layer was separated, washed with 5% aqueous hydrochloric acid and water, and then dried with magnesium sulfate. The solvent was evaporated in vacuo and the residual oil distilled, B.P. 90–95° C./1.1 mm. The product was identified by elemental analysis and by its nuclear magnetic resonance spectrum.

*Analysis.*—Calcd. (percent): C, 59.8; H, 7.99; N, 6.94. Found (percent): C, 59.5; H, 8.59; N, 7.66.

EXAMPLE 9

Preparation of N-cyclopropylmethyl-N-ethyl-α-chloroacetamide

Chloroacetic anhydride (13.1 g., 0.077 mole) was dissolved in 75 ml. of toluene and to this stirred chilled solution was added N-cyclopropylmethyl-N-ethylamine (7.6 g., 0.077 mole) in 45 minutes. The resulting solution was stirred to room temperature and then heated at 100° C. for three hours. The solution after cooling was washed well with water, 6% aqueous sodium hydroxide solution, 6% aqueous hydrochloric acid solution, and finally water again. The dried organic layer was distilled to give the desired product as an oil, B.P. 120° C./0.18 mm.

*Analysis.*—Calcd. (percent): C, 54.7; H, 8.04; N, 7.98. Found (percent): C, 54.7; H, 7.93; N, 7.92.

EXAMPLE 10

Preparation of N-cyclopropylmethyl-N-n-propyl-α-chloroacetamide

According to the procedure of Example 8, N-cyclopropylmethyl-N-n-propylamine was reacted with chloroacetylchloride to give the product, B.P. 146° C./1.3 mm.

*Analysis.*—Calcd. (percent): C, 57.1; H, 8.52; N, 7.39. Found (percent): C, 56.7; H, 8.46; N, 7.04.

EXAMPLE 11

Preparation of N-cyclopropylmethyl-N-i-propyl-α-chloroacetamide

According to the procedure of Example 9, N-cyclopropylmethyl-N-i-propylamine was reacted with chloroacetic anhydride to give an oily product, B.P. 104° C./0.1 mm.

*Analysis.*—Calcd. (percent): C, 57.1; H, 8.52; N, 7.39. Found (percent): C. 57.3; H, 8.88; N, 7.79.

EXAMPLE 12

Preparation of N-cyclopropylmethyl-N-n-butyl-α-chloroacetamide

N-cyclopropylmethyl-N-n-butylamine was reacted with chloroacetic anhydride according to the procedure of Example 9 to give the product, B.P. 110–15° C./0.45 mm.

*Analysis.*—Calcd. (percent): C, 59.1; H, 8.92; N, 6.88. Found (percent): C, 58.7; H, 8.53; N, 7.08.

EXAMPLE 13

Preparation of N-cyclopropylmethyl-N-allyl-α-chloroacetamide

N-cyclopropylmethyl-N-allylamine was reacted with chloroacetylchloride according to the procedure of Example 8 to give the product, B.P. 90° C./0.1 mm.

*Analysis.*—Calcd. (percent): C, 57.7; H, 7.53; N, 7.47. Found (percent): C, 57.7; H, 7.51; N, 7.21.

EXAMPLE 14

Test for herbicidal utility of these compounds

Representative compounds from those prepared in the previous examples were evaluated for pre-emergence herbicidal activity. The test procedure employed was as follows:

Two flats seeded with six crops (cotton, soybean, tomato, corn, rice and oats) and six weeds (mustard, morning glory, crabgrass, yellow foxtail, Johnson grass and velvet leaf) were sprayed with a formulation containing the test chemical at the rate given in Table I. The test chemicals were sprayed as acetone solutions or acetone suspensions of very small particle size onto the test plants. Sprayers were calibrated to deliver a certain volume of liquid and the calculated amount of active ingredient which would give a rate corresponding to the indicated pounds/acre. The flats were then held in the greenhouse and a response rated after 12 days to 16 days. Response was rated by a scale of 0–10. The 0–10 scale is defined as: 0=no injury; 1–3=slight injury; 4–6=moderate injury, plants may die; 7–9=severe injury, plants will probably die; 10=all plants dead (complete kill). The results of this test as shown below are indicative that many of these compounds show a high degree of herbicidal activity in many weed species, but may remain highly tolerant of desirable crop species.

EXAMPLE 15

Representative derivatives of the various compounds of this invention were evaluated for post-emergence activity. The test procedure was as follows:

Flats were seeded, as described in the previous example and held until the first true leaves had appeared on all plants which were then sprayed in the same fashion as in the preceding example at a rate of 10 lbs. per acre. The plant responses were rated 12 to 16 days after treat- TABLE I.—PRE-EMERGENCE HERBICIDAL ACTIVITY OF THE COMPOUNDS OF THE SUBJECT INVENTION AT 10 LBS./ACRE

| Compound name | Corn | Soybean | Cotton | Rice | Morning glory | Tomato | Oats | Cbgs | JG | Yellow foxtail | Vel. leaf | Mustard |
|---|---|---|---|---|---|---|---|---|---|---|---|---|
| 3-phenyl-1-cyclopropylmethyl-1-methylurea | 3 | 2 | 5 | 3 | 9 | 5 | 6 | 10 | 8 | 9 | 9 | 10 |
| 3-(3-trifluoromethylphenyl)-1-cyclopropylmethyl-1-methylurea | 0 | 2 | 0 | 0 | 8 | 1 | 0 | 4 | 1 | 8 | 2 | 10 |
| 3-(4-chlorophenyl)-1-cyclopropylmethyl-1-methylurea | 5 | 5 | 0 | 0 | 4 | 2 | 9 | 9 | 8 | 8 | 10 | 10 |
| 3-(3,4-dichlorophenyl(-1-cyclopropylmethyl-1-methylurea | 0 | 2 | 2 | 0 | 5 | 0 | 4 | 7 | 5 | 6 | 5 | 10 |
| 3-(3,4-dichlorophenyl)-1-cyclopropylmethyl-1-n-propylurea | 0 | 0 | 0 | 0 | 0 | 0 | 0 | 0 | 0 | 1 | 0 | 0 |
| 3-phenyl-3-cyclopropylmethl-1,1-dimethylurea | 0 | 0 | 4 | 0 | 10 | 6 | 0 | 0 | 0 | 0 | 8 | 4 |
| 3-(3,4-dichlorophenyl)-3-cyclopropylmethyl-1,1-dimethylurea | 0 | 0 | 0 | 0 | 0 | 0 | 2 | 8 | 4 | 0 | 3 | 5 |
| N-cyclopropylmethyl-N-ethyl-α-chloroacetamide | 0 | 0 | 10 | 8 | 0 | 2 | 3 | 10 | 10 | 9 | 3 | 2 |
| N-cyclopropylmethyl-N-n-propyl-α-chloroacetamide | 1 | 1 | 4 | 5 | 0 | 1 | 5 | 10 | 9 | 10 | 3 | 3 |
| N-cyclopropylmethyl-N-iso-propyl-α-chloroacetamide | 0 | 0 | 7 | 6 | 0 | 0 | 3 | 10 | 10 | 9 | 5 | 1 |
| N-cyclopropylmethyl-N-n-butyl-α-chloroacetamide | 0 | 0 | 8 | 8 | 0 | 0 | 3 | 10 | 8 | 9 | 4 | + 1 |
| N,N-bis(cyclopropylmethyl)-α-chloroacetamide | 1 | 1 | 3 | 4 | 0 | 4 | 3 | 9 | 5 | 9 | 0 | 0 |
| N-cyclopropylmethyl-N-allyl-α-chloroacetamide | 0 | 0 | 2 | 0 | 0 | 0 | 0 | 8 | 3 | 0 | | 0 |

TABLE II.—POST-EMERGENCE HERBICIDAL ACTIVITY OF THE COMPOUNDS OF THE SUBJECT INVENTION AT 10 LBS./ACRE

| Compound name | Corn | Soybean | Cotton | Rice | Morning glory | Tomato | Oats | Cbgs | JG | Yellow foxtail | Vel. leaf | Mustard |
|---|---|---|---|---|---|---|---|---|---|---|---|---|
| 3-phenyl-1-cyclopropylmethyl-1-methylurea | 9 | 10 | 10 | 6 | 10 | 10 | 6 | 10 | 6 | 9 | 10 | 10 |
| 3-(3-trifluoromethylphenyl)-1-cyclopropylmethyl-1-methylurea | 2 | 8 | 10 | 7 | 9 | 10 | 3 | 9 | 3 | 9 | 1 | 9 |
| 3-(4-chlorophenyl)-1-cyclopropylmethyl-1-methylurea | 4 | 8 | 1 | 3 | 7 | 10 | 3 | 5 | 6 | 9 | 10 | 10 |
| 3-(3,4-dichlorophenyl)-1-cyclopropylmethyl-1-methylurea | 10 | 10 | 10 | 4 | 10 | 10 | 8 | 10 | 5 | 9 | 8 | 10 |
| 3-(3,4-dichlorophenyl)-1-cyclopropylmethyl-1-n-propylurea | 4 | 4 | 1 | 3 | 3 | 5 | 5 | 8 | 4 | 4 | 0 | 7 |
| 3-phenyl-3-cyclopropylmethyl-1,1-dimethylurea | 4 | 10 | 10 | 2 | 10 | 10 | 3 | 9 | 9 | 9 | 9 | 10 |
| 3-(3,4-dichlorophenyl)-3-cyclopropylmethyl-1,1-dimethylurea | 6 | 8 | 4 | 1 | 10 | 9 | 10 | 10 | 10 | 9 | 9 | 10 |
| N-cyclopropylmethyl-N-ethyl-α-chloroacetamide | 1 | 4 | 10 | 3 | 2 | 8 | 3 | 3 | 1 | 2 | 3 | 1 |
| N-cyclopropylmethyl-N-n-propyl-α-chloroacetamide | 4 | 5 | 4 | 5 | 3 | 10 | 5 | 10 | 10 | 8 | 10 | 9 |
| N-cyclopropylmethyl-N-iso-propyl-α-chloroacetamide | 1 | 3 | 2 | 2 | 1 | 5 | 2 | 2 | 2 | 3 | 0 | 0 |
| N-cyclopropylmethyl-N-n-butyl-α-chloroacetamide | 2 | 5 | 5 | 3 | 3 | 9 | 2 | 6 | 7 | 6 | 2 | 3 |
| N,N-bis(cyclopropylmethyl)-α-chloroacetamide | 4 | 6 | 4 | 5 | 5 | 9 | 8 | 10 | 9 | 10 | 10 | 10 |
| N-cyclopropylmethyl-N-allyl-α-chloroacetamide | 2 | 4 | 9 | 1 | 2 | 9 | 4 | 5 | 2 | 3 | 6 | 3 |

What is claimed is:

1. A compound of the formula

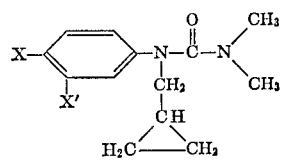

in which X and X' are hydrogen or chlorine.

2. A compound according to claim 1, which is 3-phenyl-3-cyclopropylmethyl-1,1-dimethylurea.

3. A compound according to claim 1, which is 3-(3,4-dichlorophenyl)-3-cyclopropylmethyl-1,1-dimethylurea.

References Cited

UNITED STATES PATENTS 2,726,150    12/1955    Wolter _____ 260—553 A

LEON ZITVER, Primary Examiner

M. W. GLYNN, Assistant Examiner